United States Patent
Lee (10) Patent No.: US 11,028,762 B2
(45) Date of Patent: Jun. 8, 2021

(54) ELASTIC SUPPORT FOR AN EXHAUST SYSTEM

(71) Applicants: HYUNDAI MOTOR COMPANY, Seoul (KR); KIA MOTORS CORPORATION, Seoul (KR)

(72) Inventor: Sang Ho Lee, Andong-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 91 days.

(21) Appl. No.: 16/426,772

(22) Filed: May 30, 2019

(65) Prior Publication Data

US 2020/0173335 A1 Jun. 4, 2020

(30) Foreign Application Priority Data

Dec. 3, 2018 (KR) .................. 10-2018-0153849

(51) Int. Cl.
*F01N 13/18* (2010.01)
*B60K 13/04* (2006.01)

(52) U.S. Cl.
CPC .......... *F01N 13/1822* (2013.01); *B60K 13/04* (2013.01)

(58) Field of Classification Search
CPC ............................ B60K 13/04; F01N 13/1822
See application file for complete search history.

(56) References Cited

U.S. PATENT DOCUMENTS

| | | | |
|---|---|---|---|
| 5,271,595 A | 12/1993 | Simon | |
| 6,402,119 B1* | 6/2002 | Miska | B60K 13/04 248/58 |
| 6,739,557 B2* | 5/2004 | Kato | B60K 13/04 248/58 |
| 7,510,043 B2* | 3/2009 | Cerri, III | B60K 13/04 180/296 |
| 7,575,216 B2* | 8/2009 | Zimmermann | B60K 13/04 248/60 |
| 7,637,472 B2* | 12/2009 | Endo | B60K 13/04 180/309 |
| 9,593,620 B2* | 3/2017 | Makino | F01N 13/1822 |
| 10,519,846 B2* | 12/2019 | Kamiya | F16B 9/07 |
| 10,718,253 B2* | 7/2020 | Rodecker | F01N 13/1822 |
| 10,801,391 B2* | 10/2020 | Moetakef | F01N 13/1822 |
| 2009/0230601 A1* | 9/2009 | Lenda | B60K 13/04 267/141.1 |
| 2018/0291782 A1* | 10/2018 | Edo | F01N 13/1822 |

FOREIGN PATENT DOCUMENTS

| | | |
|---|---|---|
| JP | S61152523 | 9/1986 |
| KR | 2019980018776 | 7/1998 |
| KR | 20020035356 | 5/2002 |
| KR | 100844731 B1 | 7/2008 |
| KR | 101808573 B1 | 12/2017 |

* cited by examiner

*Primary Examiner* — Bradley Duckworth
(74) *Attorney, Agent, or Firm* — Lempia Summerfield Katz LLC (57) ABSTRACT

An elastic support for an exhaust system includes a support body, which is made of an elastic material. The support body includes a first fitting opening into which a first bracket is fitted and a second fitting opening into which a second bracket is fitted. An axis of the first fitting opening is orthogonal to an axis of the second fitting opening.

9 Claims, 9 Drawing Sheets

ELASTIC SUPPORT FOR AN EXHAUST SYSTEM

CROSS-REFERENCE TO RELATED APPLICATION

This application is based on and claims the benefit of priority to Korean Patent Application No. 10-2018-0153849, filed on Dec. 3, 2018, in the Korean Intellectual Property Office, the disclosure of which is incorporated herein in its entirety by reference.

TECHNICAL FIELD

The present disclosure relates to an elastic support for an exhaust system, and more particularly, to an elastic support for an exhaust system, capable of easily absorbing vibrations or impacts transmitted along multiple axes and improving vibration isolation performance against biaxial force such as moment or torsion.

BACKGROUND

A rubber hanger or hanger device is a type of elastic support that elastically supports components of an exhaust system, such as an exhaust pipe, an exhaust purifier, and a muffler. The rubber hanger provides mechanical connections between a vehicle body and the exhaust system.

A conventional rubber hanger includes a metal bracket and a rubber elastic body connected to the bracket.

As a conventional rubber hanger has a structure specific to the specifications of a vehicle, its range of use is limited. Also, it is not easy to manage durability or airtightness between the bracket and the elastic body.

Meanwhile, the rubber hangers are classified into hard-type rubber hangers having hard elastic properties, and soft-type rubber hangers having soft elastic properties.

The hard-type rubber hanger may be suitable for exhaust system components with relatively heavy weight and may be configured to absorb or isolate vibrations or impacts transmitted along the height direction of the vehicle. However, the hard-type rubber hanger may be vulnerable to damage or reduced vibration isolation due to the transmission of an external force such as a bending moment or torsion. In addition, the hard-type rubber hanger is or may be relatively poor at smoothly absorbing vibrations. In the case in which an object supported thereby is an exhaust purifier, which is expensive, the vibrations may be directly transmitted to the exhaust purifier. Accordingly, if resonance occurs, the expensive exhaust purifier may be damaged.

The soft-type rubber hanger may be suitable for exhaust system components with relatively light weight and may be able to easily absorb vibrations or impacts transmitted along three axes of a three-dimensional coordinate system. However, the soft-type rubber hanger may be damaged due to plastic deformation when continuous external force equal to or higher than the inherent elastic strain rate of the rubber hanger is applied. The soft-type rubber hanger also may not be suitable for supporting relatively heavy exhaust system components. In particular, the soft-type rubber hanger has extremely poor durability against some external force such as a bending moment or torsion.

The above information described in this background section is provided to assist in understanding the background of the inventive concept. The background section may include a technical concept, which is not considered as prior art that is already known to those having ordinary skill in the art.

SUMMARY

The present disclosure is made to solve the above-mentioned problems occurring in the prior art while advantages achieved by the prior art are maintained intact.

An aspect of the present disclosure provides an elastic support for an exhaust system capable of easily absorbing vibrations or impacts transmitted along multiple axes and improving vibration isolation performance against biaxial force such as moment or torsion.

According to an aspect of the present disclosure, an elastic support for an exhaust system may include a support body, which is made of an elastic material. The support body may include a first fitting opening into which a first bracket is fitted and a second fitting opening into which a second bracket is fitted. An axis of the first fitting opening may be orthogonal to an axis of the second fitting opening.

The first fitting opening and the second fitting opening may be spaced apart from each other in a height direction of the support body.

The support body may further include a first cavity adjacent to the first fitting opening and a second cavity adjacent to the second fitting opening.

The elastic support may further include a first elastic piece positioned between the first cavity and the first fitting opening.

The first elastic piece may include a pair of first sidewalls and a first crosspiece extending between the pair of first sidewalls.

Each first sidewall may have a first inclined surface facing the first cavity.

The elastic support may further include a second elastic piece positioned between the second cavity and the second fitting opening.

The second elastic piece may include a pair of second sidewalls and a second crosspiece extending between the pair of second sidewalls.

Each second sidewall may have a second inclined surface facing the second cavity.

The first bracket may be press-fit into the first fitting opening.

The second bracket may be press-fit into the second fitting opening.

BRIEF DESCRIPTION OF THE DRAWINGS

The above and other objects, features, and advantages of the present disclosure will be more apparent from the following detailed description taken in conjunction with the accompanying drawings.

DETAILED DESCRIPTION

Hereinafter, embodiments of the present disclosure are described in detail with reference to the accompanying drawings. In the drawings, the same reference numerals are used throughout to designate the same or equivalent elements. In addition, a detailed description of well-known techniques associated with the present disclosure may have been left out in order not to unnecessarily obscure the gist of the present disclosure.

Terms such as first, second, A, B, (a), and (b) may be used to describe the elements in embodiments of the present disclosure. These terms are only used to distinguish one element from another element. The intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art. Such terms are not to be interpreted as having ideal or excessively formal meanings unless clearly defined as having such in the present application.

Referring to FIGS. 1-4, an elastic support 10 for an exhaust system according to an embodiment of the present disclosure may include a support body 15 made of an elastic material.

The support body 15 may have a polyhedral shape, such as a cube, a rectangular cuboid, a cylinder, a cone, or a truncated cone.

For example, the support body 15 may have the form of a rectangular cuboid as illustrated in FIGS. 1-8.

The support body 15 may include a first fitting opening 11 extending along the direction of a first axis Y and a second fitting opening 12 extending along the direction of a second axis X. In this embodiment, the axis Y of the first fitting opening 11 may be orthogonal to the axis X of the second fitting opening 12.

In addition, the first fitting opening 11 and the second fitting opening 12 may be spaced apart from each other in a height direction of the support body 15, such as in the direction of a third axis Z.

The first axis may correspond to a Y axis of a three-dimensional coordinate system, the second axis may correspond to an X axis of the three-dimensional coordinate system, and the third axis may correspond to a Z axis of the three-dimensional coordinate system.

Figure 1:
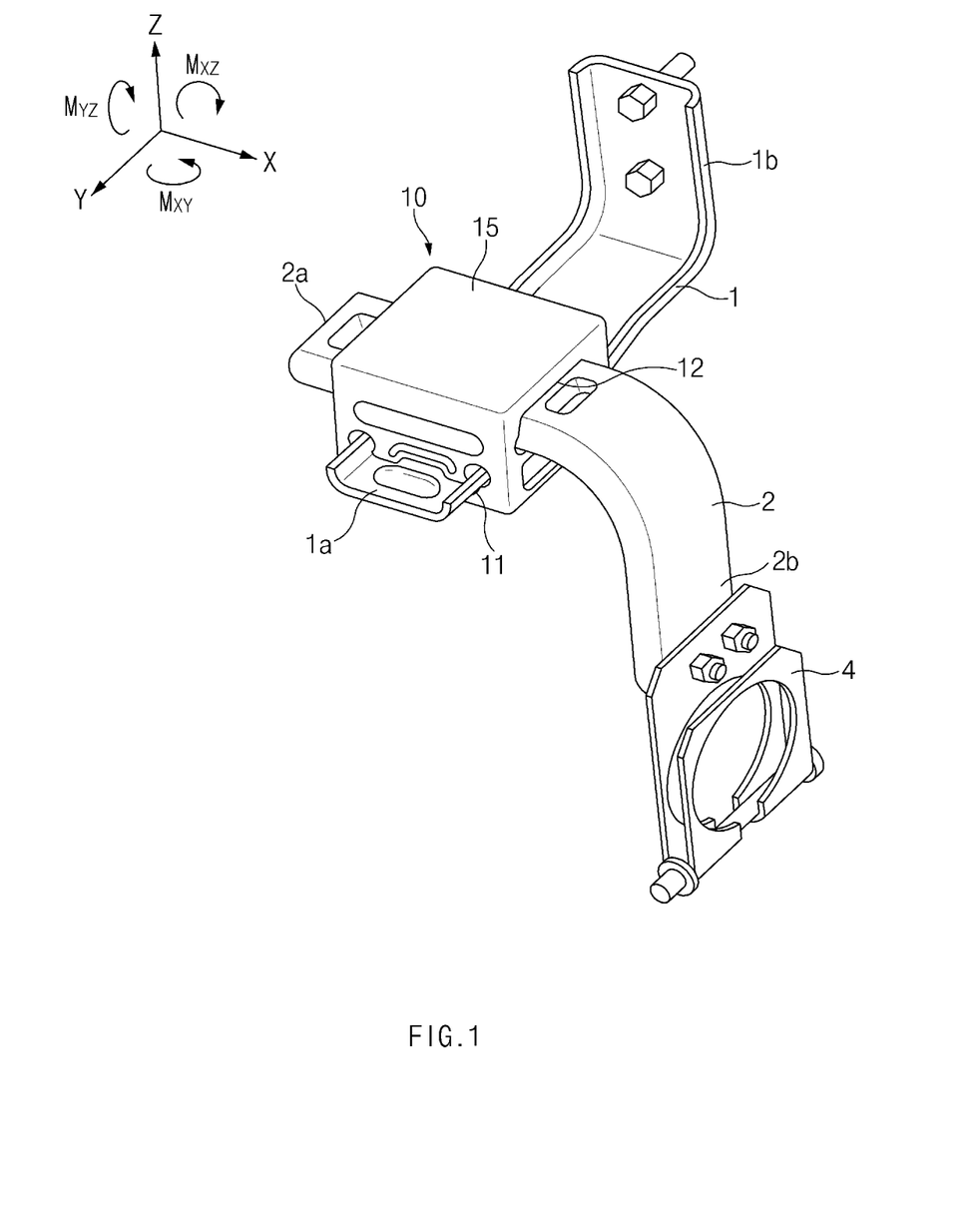
FIG. 1 illustrates a state in which a first bracket and a second bracket are fitted into an elastic support for an exhaust system according to an embodiment of the present disclosure.
Figure 2:
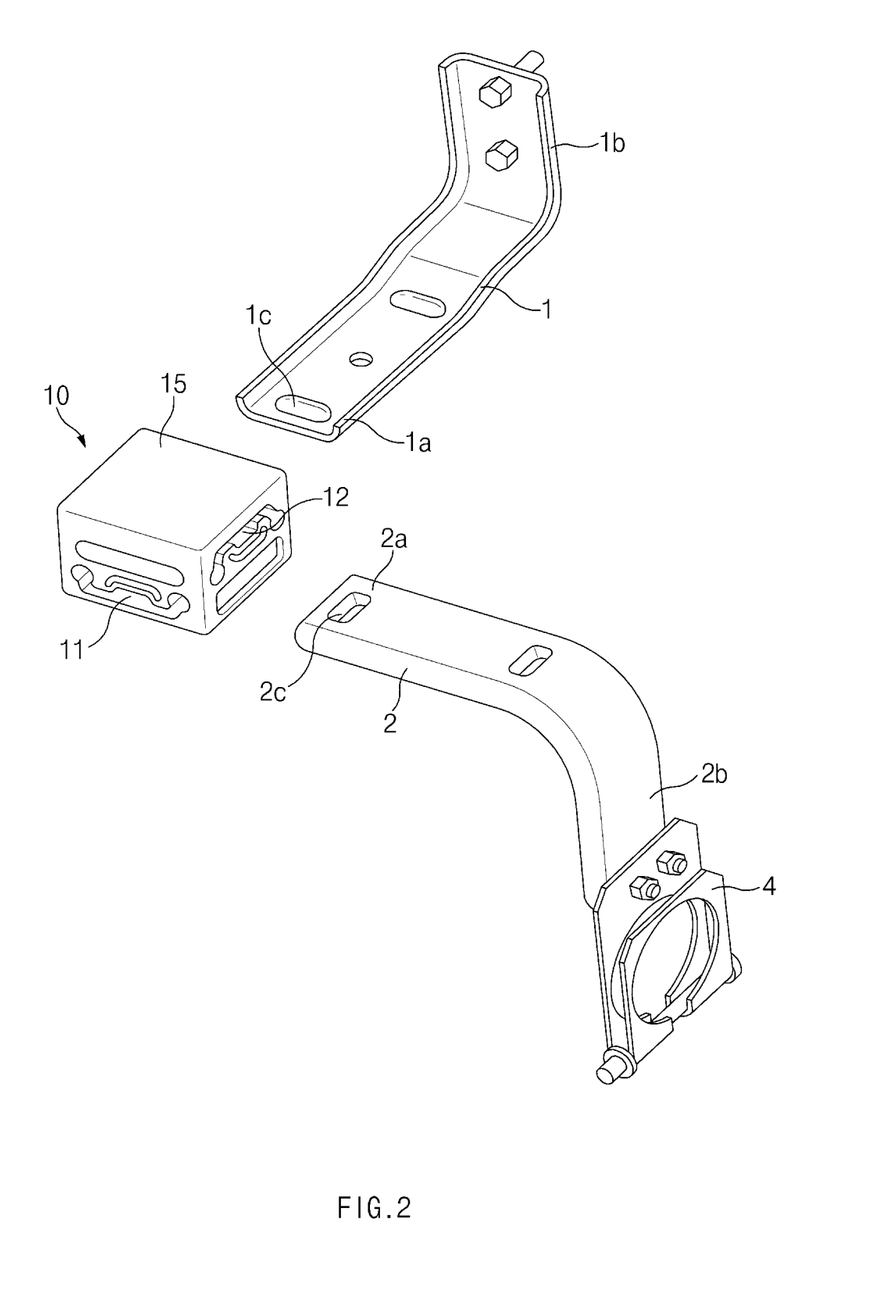
FIG. 2 illustrates a state in which a first bracket and a second bracket are separated from an elastic support for an exhaust system according to an embodiment of the present disclosure.

One end 1a of a first bracket 1 may be fitted into the first fitting opening 11 of the support body 15. The first bracket 1 may have a pair of flanges at both sides thereof. According to an embodiment, the first bracket 1 may be a vehicle body side bracket. The other end 1b of the first bracket 1 may be attached to a frame or the like of the vehicle body.

One end 2a of a second bracket 2 may be fitted into the second fitting opening 12. The second bracket 2 may have a pair of flanges at both sides thereof. According to an embodiment, the second bracket 2 may be an exhaust pipe side bracket. A holder 4 supporting an exhaust pipe 5 may be attached to the other end 2b of the second bracket 2 so that the other end 2b of the second bracket 2 may be connected to the exhaust pipe 5.

As above, the first bracket 1 and the second bracket 2 may be connected to be orthogonal to each other through the first fitting opening 11 and the second fitting opening 12 of the support body 15. Thus, the elastic support may easily absorb vibrations or impacts transmitted along the first axis Y, the second axis X, and the third axis Z. Also, the elastic support may improve vibration isolation performance against biaxial force such as moment, i.e., a bending moment, or torsion.

Figure 3:
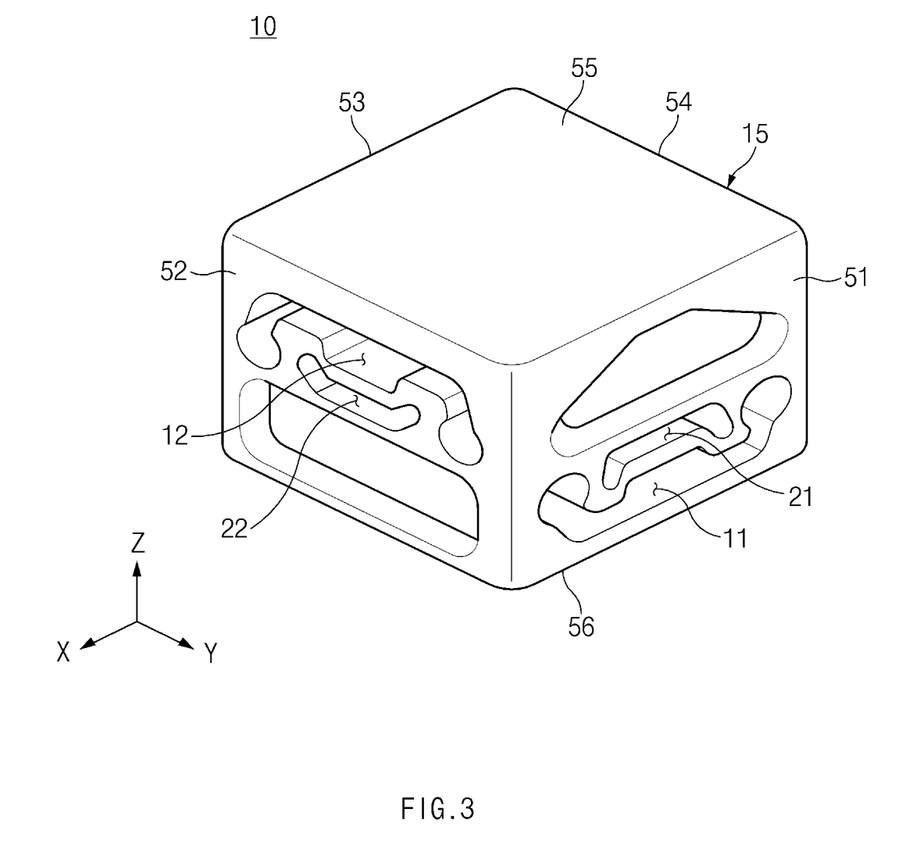
FIG. 3 illustrates a perspective view of an elastic support for an exhaust system according to an embodiment of the present disclosure.
Figure 4:
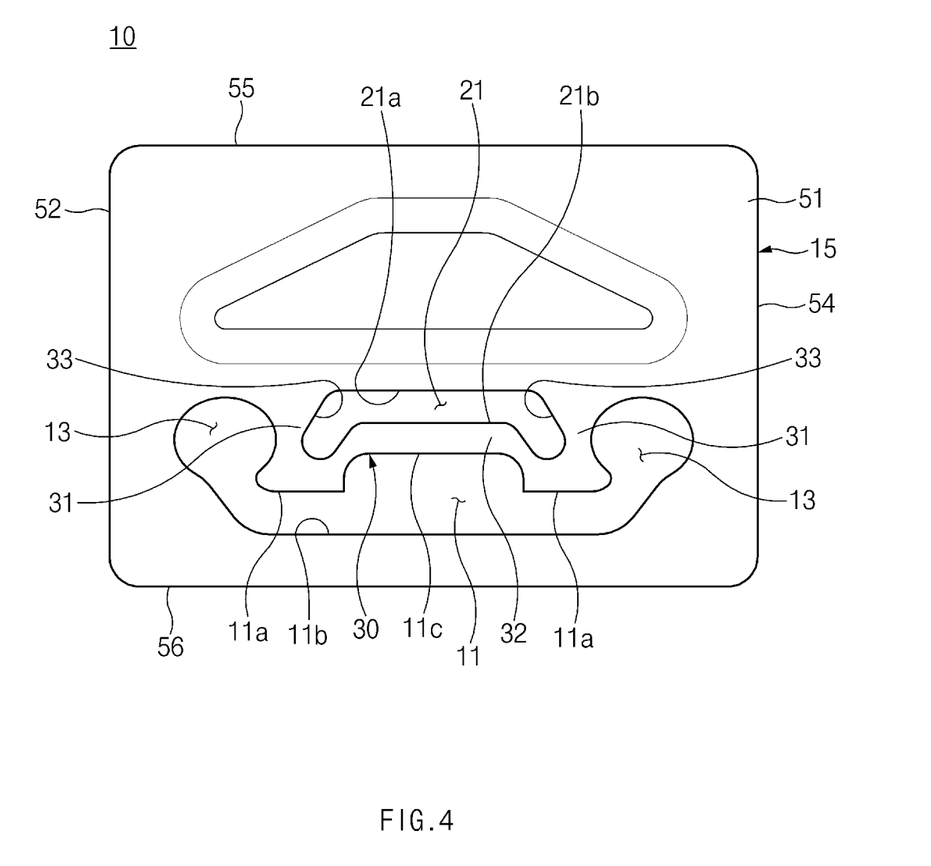
FIG. 4 illustrates a view of a first fitting opening in an elastic support for an exhaust system according to an embodiment of the present disclosure.
Figure 5:
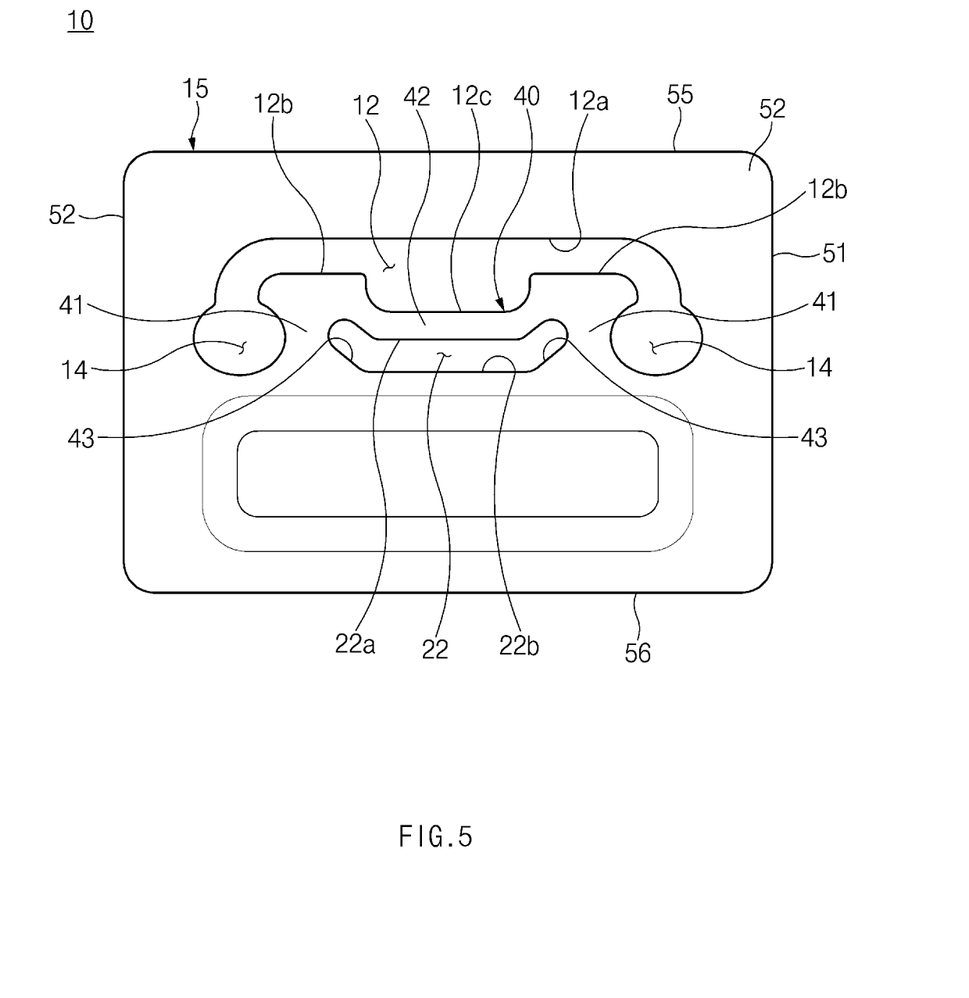
FIG. 5 illustrates a view of a second fitting opening in an elastic support for an exhaust system according to an embodiment of the present disclosure.

Referring to FIGS. 3-5, the support body 15 may have a first side surface 51, a second side surface 52 orthogonal to the first side surface 51, a third side surface 53 opposing the first side surface 51, a fourth side surface 54 opposing the second side surface 52, a top surface 55, and a bottom surface 56.

Referring to FIGS. 3 and 4, the first fitting opening 11 may extend between the first side surface 51 and the third side surface 53 along the direction of the first axis Y. The first fitting opening 11 may extend along a transverse direction of the first side surface 51 and a transverse direction of the third side surface 53. The first fitting opening 11 may have a pair of first side openings 13 formed at both, i.e., opposite sides thereof. Each first side opening 13 may be defined by a circular cross-section having a diameter larger than the thickness or height of the first fitting opening 11. The flanges of the first bracket 1 may be inserted into the first side openings 13, respectively.

Referring to FIGS. 3 and 5, the second fitting opening 12 may extend between the second side surface 52 and the fourth side surface 54 along the direction of the second axis X. The second fitting opening 12 may extend along a transverse direction of the second side surface 52 and a transverse direction of the fourth side surface 54. The second fitting opening 12 may have a pair of second side openings 14 formed at both, i.e., opposite sides thereof. Each second side opening 14 may be defined by a circular cross-section having a diameter larger than the thickness or height of the second fitting opening 12. The flanges of the second bracket 2 may be inserted into the second side openings 14, respectively.

The support body 15 may include a first cavity 21 adjacent to the first fitting opening 11, and a second cavity 22 adjacent to the second fitting opening 12.

Referring to FIGS. 3 and 4, the first cavity 21 may be positioned above the first fitting opening 11. A first elastic piece 30 may be positioned between the first cavity 21 and the first fitting opening 11. As force, moment, or torsion is transmitted to the elastic support 10, the first elastic piece 30 may be elastically deformed between the first cavity 21 and the first fitting opening 11. The first elastic piece 30 may include a pair of first sidewalls 31, and a first crosspiece 32 extending between the pair of first sidewalls 31. The pair of first sidewalls 31 may be disposed to oppose each other on both sides of the first cavity 21, and the first sidewalls 31 may face the first side openings 13, respectively. Each first sidewall 31 may have a first inclined surface 33 facing the first cavity 21.

The first fitting opening 11 may have a top surface 11a contacting a top surface of the first bracket 1, a bottom surface 11b contacting a bottom surface of the first bracket 1, and an offset surface 11c, which is offset upwardly from the top surface 11a. One end 1a of the first bracket 1 may have a protrusion 1c. The protrusion 1c of the first bracket 1 may be fitted into the offset surface 11c of the first fitting opening 11.

The first cavity 21 may have a top surface 21a and a bottom surface 21b spaced apart from the top surface 21a. The periphery of the first cavity 21 may be elastically deformed according to the magnitude of load (for example, the weight of the exhaust pipe 5) applied to the second bracket 2 fitted into the second fitting opening 12. Accordingly, the top surface 21a and the bottom surface 21b of the first cavity 21 may be spaced apart from each other or may contact each other.

According to an embodiment, one end 1a of the first bracket 1 may be forcibly fitted (press-fit) into the first fitting opening 11. In this embodiment, the dimension of the first fitting opening 11 may be less than the dimension of one end 1a of the first bracket 1.

Referring to FIGS. 3 and 5, the second cavity 22 may be positioned below the second fitting opening 12. A second elastic piece 40 may be positioned between the second cavity 22 and the second fitting opening 12. As force, moment, or torsion is transmitted to the elastic support 10, the second elastic piece 40 may be elastically deformed between the second cavity 22 and the second fitting opening 12. The second elastic piece 40 may include a pair of second sidewalls 41 and a second crosspiece 42 extending between the pair of second sidewalls 41.

The pair of second sidewalls 41 may be disposed to oppose each other on both sides of the second cavity 22. The second sidewalls 41 may face the second side openings 14, respectively. Each second sidewall 41 may have a second inclined surface 43 facing the second cavity 22.

The second fitting opening 12 may have a top surface 12a contacting a top surface of the second bracket 2, a bottom surface 12b contacting a bottom surface of the second bracket 2, and an offset surface 12c, which is offset downwardly from the top surface 12a. One end 2a of the second bracket 2 may have a protrusion 2c. The protrusion 2c of the second bracket 2 may be fitted into the offset surface 12c of the second fitting opening 12.

According to an embodiment, one end 2a of the second bracket 2 may be forcibly fitted (press-fit) into the second fitting opening 12. In this embodiment, the dimension of the second fitting opening 12 may be less than the dimension of one end 2a of the second bracket 2.

The second cavity 22 may have a top surface 22a and a bottom surface 22b spaced apart from the top surface 22a. The periphery of the second cavity 22 may be elastically deformed according to the magnitude of load (for example, the weight of the exhaust pipe 5) applied to the second bracket 2 fitted into the second fitting opening 12. Accordingly, the top surface 22a and the bottom surface 22b of the second cavity 22 may be spaced apart from each other or may contact each other.

Figure 6:
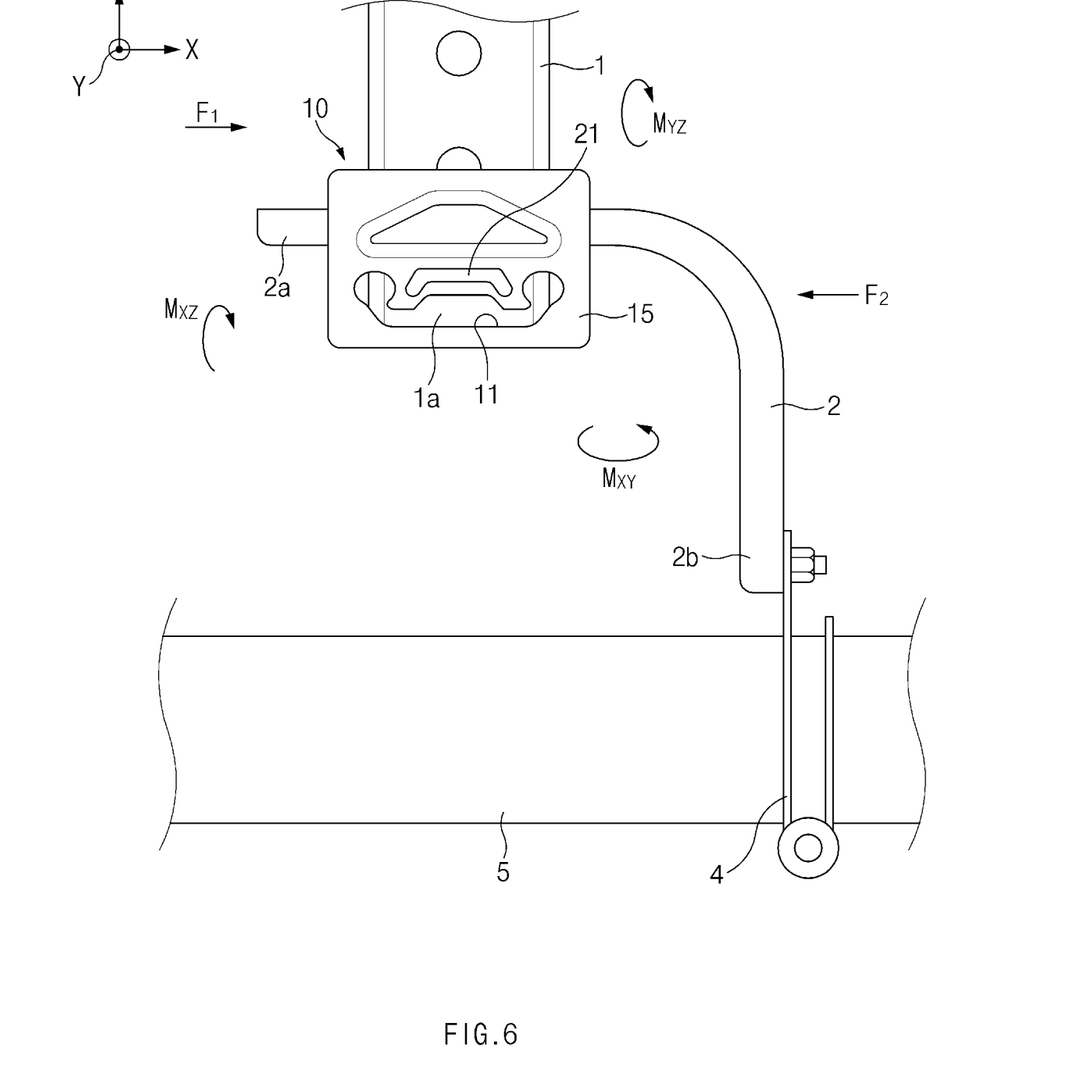
FIG. 6 illustrates a state in which an exhaust pipe is supported by an elastic support for an exhaust system according to an embodiment of the present disclosure.

Referring to FIG. 6, the first bracket 1 and the second bracket 2 may intersect and be fitted into the elastic support 10 according to an embodiment of the present disclosure. The other end 1b of the first bracket 1 may be mounted on the vehicle body and the other end 2b of the second bracket 2 may be mounted on the exhaust pipe 5 of the exhaust system.

Due to rolling, yawing, or pitching of the vehicle during driving, forces $F_1$ and $F_2$, such as impacts or vibrations and moments $M_{xy}$, $M_{xz}$, and $M_{yz}$, may be transmitted from the exhaust pipe 5 to the elastic support 10.

The elastic support 10 according to an embodiment of the present disclosure may combine the first bracket 1 and the second bracket 2 while allowing the first bracket 1 and the second bracket 2 to intersect through the first and second fitting openings 11 and 12, which are orthogonal to each other. The elastic support 10 may effectively absorb or reduce the vibrations, impacts, or the like transmitted along the directions of respective axes X, Y, and Z by means of the first cavity 21, the first elastic piece 30, the second cavity 22, and the second elastic piece 40.

Figure 7:
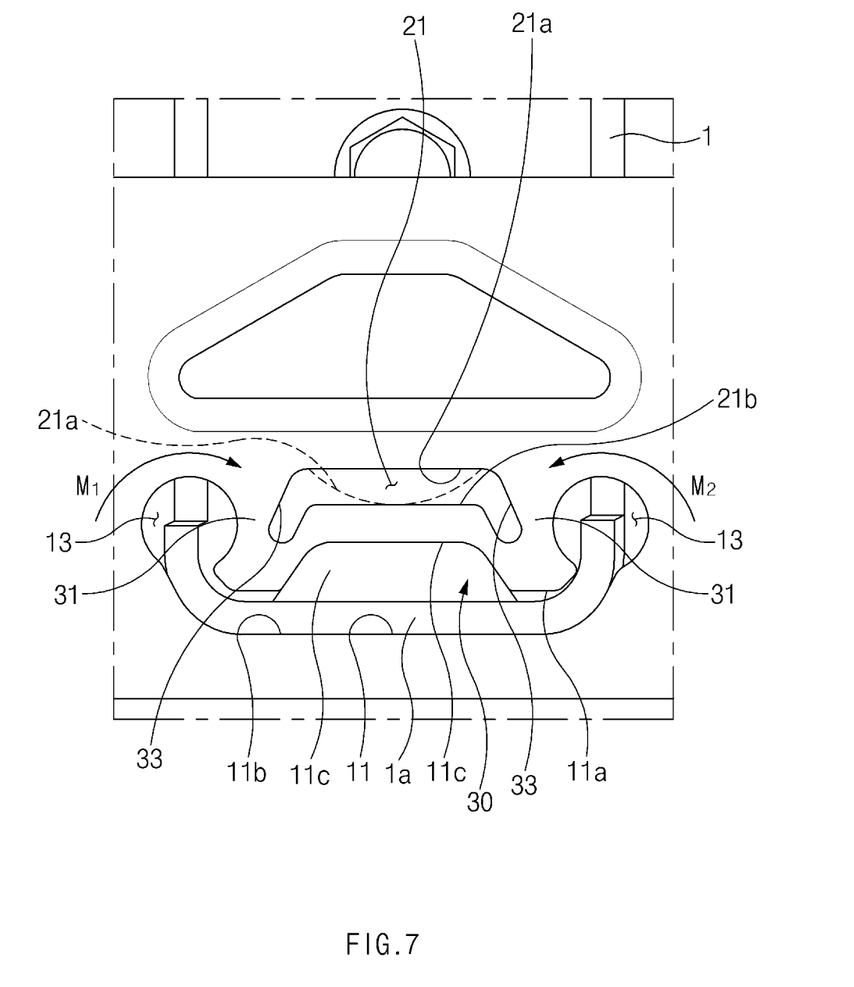
FIG. 7 illustrates a state in which one end of a first bracket is fitted into a first fitting opening of an elastic support for an exhaust system according to an embodiment of the present disclosure.

Referring to FIG. 7, when moments $M_1$ and $M_2$ act on the first fitting opening 11 of the elastic support 10, the first sidewalls 31 of the first elastic piece 30 may effectively absorb or isolate the moments or torsion by elastic deformation of the first inclined surfaces 33, respectively. In addition, even though the force is applied along the axis Y of the first fitting opening 11 and the axes X and Z orthogonal to the axis Y, the first sidewalls 31 and/or the first crosspiece 32 of the first elastic piece 30 may be elastically deformed so that the vibrations or impacts transmitted along the axes X, Z, and Y may be effectively absorbed or isolated.

When the weight of an exhaust system component (for example, the exhaust pipe 5) mounted on the second bracket 2 is less than a predetermined value, the top surface 21a of the first cavity 21 and the bottom surface 21b of the first cavity 21 may remain in a state of being spaced apart from each other. Thus, the support body 15 may have soft elastic properties such that the first sidewalls 31 and/or the first crosspiece 32 may be softly and elastically deformed. That is, when the weight of the exhaust system component is less than the predetermined value, a soft-type vibration absorbing structure may be made as the top surface 21a of the first cavity 21 and the bottom surface 21b of the first cavity 21 are spaced apart from each other. In this embodiment, the predetermined value may be a reference weight at which the top surface 21a of the first cavity 21 and the bottom surface 21b of the first cavity 21 contact each other as the support body 15 is deformed.

When the weight of an exhaust system component (for example, the exhaust pipe 5) mounted on the second bracket 2 is greater than or equal to the predetermined value, the force may act on the periphery of the first cavity 21, i.e., the top surface 21a and the bottom surface 21b of the first cavity 21. The top surface 21a of the first cavity 21 and/or the bottom surface 21b of the first cavity 21 may be deformed to keep the top surface 21a of the first cavity 21 and the bottom surface 21b of the first cavity 21 in a state of contacting each other (see a dotted line in FIG. 7). Thus, the support body 15 may have hard elastic properties such that the first sidewalls 31 and/or the first crosspiece 32 may be strongly and elastically deformed. That is, when the weight of the exhaust system component is greater than or equal to the predetermined value, a hard-type vibration absorbing structure may be effectively made by maintaining contact between the top surface 21a of the first cavity 21 and the bottom surface 21b of the first cavity 21.

Figure 8:
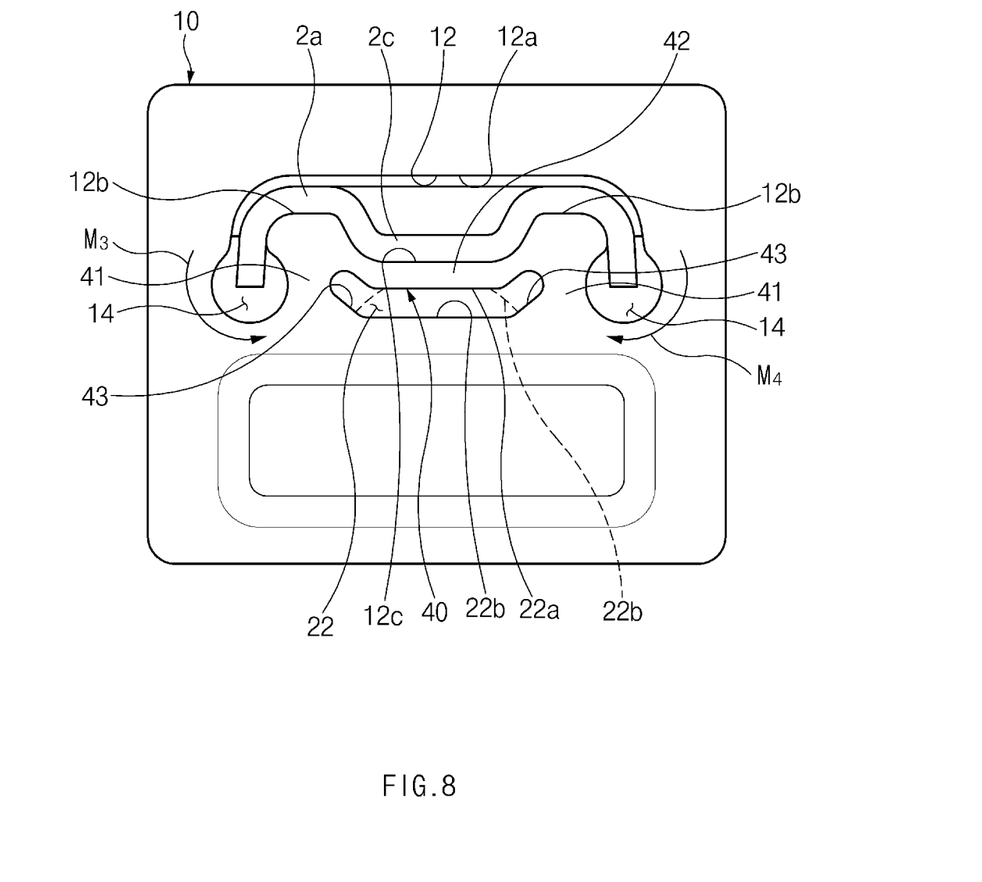
FIG. 8 illustrates a state in which one end of a second bracket is fitted into a second fitting opening of an elastic support for an exhaust system according to an embodiment of the present disclosure.

Referring to FIG. 8, when moments $M_3$ and $M_4$ act on the second fitting opening 12 of the elastic support 10, the second sidewalls 41 of the second elastic piece 40 may effectively absorb or isolate the moments or torsion by elastic deformation of the second inclined surfaces 43, respectively. In addition, even though the force is applied along the axis X of the second fitting opening 12 and the axes Y and Z orthogonal to the axis X, the second sidewalls 41 and/or the second crosspiece 42 of the second elastic piece 40 may be elastically deformed so that the vibrations or impacts transmitted along the axes X, Z, and Y may be effectively absorbed or isolated.

When the weight of an exhaust system component (for example, the exhaust pipe 5) mounted on the second bracket 2 is less than a predetermined value, the top surface 22a of the second cavity 22 and the bottom surface 22b of the second cavity 22 may remain in a state of being spaced apart from each other. Thus, the support body 15 may have soft elastic properties such that the second sidewalls 41 and/or the second crosspiece 42 may be softly and elastically deformed. That is, when the weight of the exhaust system component is less than the predetermined value, a soft-type vibration absorbing structure may be made as the top surface 22a of the second cavity 22 and the bottom surface 22b of the second cavity 22 are spaced apart from each other. In this embodiment, the predetermined value may be a reference weight at which the top surface 22a of the second cavity 22 and the bottom surface 22b of the second cavity 22 contact each other as the support body 15 is deformed.

When the weight of an exhaust system component (for example, the exhaust pipe 5) mounted on the second bracket 2 is greater than or equal to the predetermined value, the force may act on the periphery of the second cavity 22, i.e., the top surface 22a and the bottom surface 22b of the second cavity 22. The top surface 22a of the second cavity 22 and/or the bottom surface 22b of the second cavity 22 may be deformed to keep the top surface 22a of the second cavity 22 and the bottom surface 22b of the second cavity 22 in a state of contacting each other (see the dotted line in FIG. 8). Thus, the support body 15 may have hard elastic properties such that the second sidewalls 41 and/or the second crosspiece 42 may be strongly and elastically deformed. That is, when the weight of the exhaust system component is greater than or equal to the predetermined value, a hard-type vibration absorbing structure may be effectively made by maintaining contact between the top surface 22a of the second cavity 22 and the bottom surface 22b of the second cavity 22.

Figure 9:
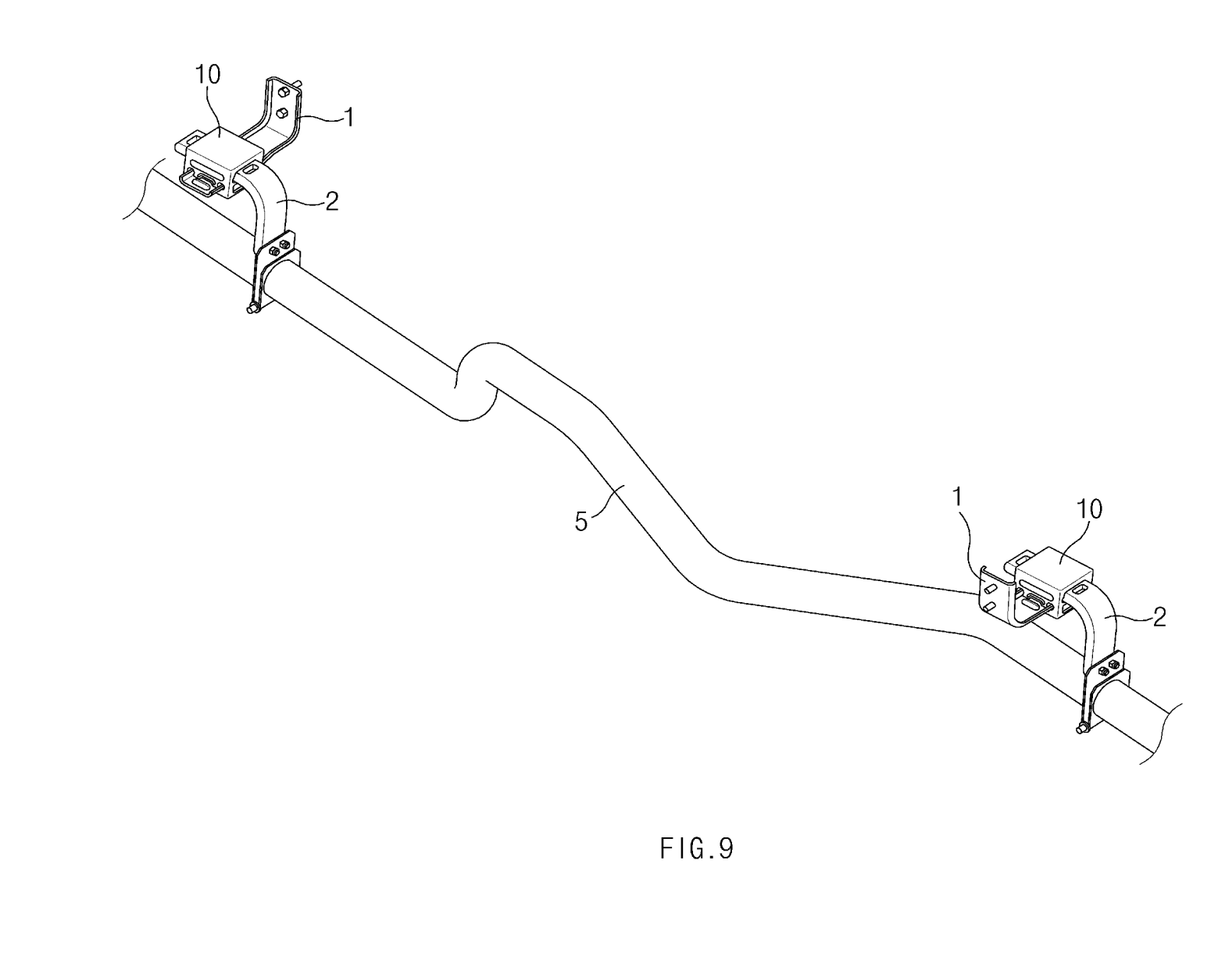
FIG. 9 illustrates a state in which an exhaust pipe is supported with respect to a vehicle body by a plurality of elastic supports for an exhaust system according to an embodiment of the present disclosure.

As illustrated in FIG. 9, the plurality of elastic supports 10 may be used to support the exhaust pipe 5 of the exhaust system with respect to the vehicle body.

As set forth above, the elastic support for an exhaust system according to embodiments of the present disclosure may easily absorb vibrations or impacts transmitted along multiple axes and may improve vibration isolation performance against biaxial force such as moment or torsion.

Hereinabove, although the present disclosure has been described with reference to embodiments and the accompanying drawings, the present disclosure is not limited thereto. The present disclosure may be variously modified and altered by those having ordinary skill in the art to which the present disclosure pertains without departing from the spirit and scope of the present disclosure claimed in the following claims.

What is claimed is:

1. An elastic support for an exhaust system, the elastic support comprising a support body, which is made of an elastic material, and which includes a first fitting opening into which a first bracket is fitted and a second fitting opening into which a second bracket is fitted,
    wherein an axis of the first fitting opening is orthogonal to an axis of the second fitting opening,
    wherein the support body includes a first cavity and a second cavity positioned between the first fitting opening and the second fitting opening,
    wherein an axis of the first cavity is orthogonal to an axis of the second cavity,
    wherein a first elastic piece is positioned between the first cavity and the first fitting opening, and
    wherein the first elastic piece includes a pair of first sidewalls and a first crosspiece extending between the pair of first sidewalls.

2. The elastic support according to claim 1, wherein the first fitting opening and the second fitting opening are spaced apart from each other in a height direction of the support body.

3. The elastic support according to claim 1, wherein the first cavity is adjacent to the first fitting opening and the second cavity is adjacent to the second fitting opening.

4. The elastic support according to claim 1, wherein each first sidewall has a first inclined surface facing the first cavity.

5. The elastic support according to claim 1, further comprising a second elastic piece positioned between the second cavity and the second fitting opening.

6. The elastic support according to claim 5, wherein the second elastic piece includes a pair of second sidewalls and a second crosspiece extending between the pair of second sidewalls.

7. The elastic support according to claim 6, wherein each second sidewall has a second inclined surface facing the second cavity.

8. The elastic support according to claim 1, wherein the first bracket is press-fit into the first fitting opening.

9. The elastic support according to claim 1, wherein the second bracket is press-fit into the second fitting opening.

* * * * *